UNITED STATES PATENT OFFICE.

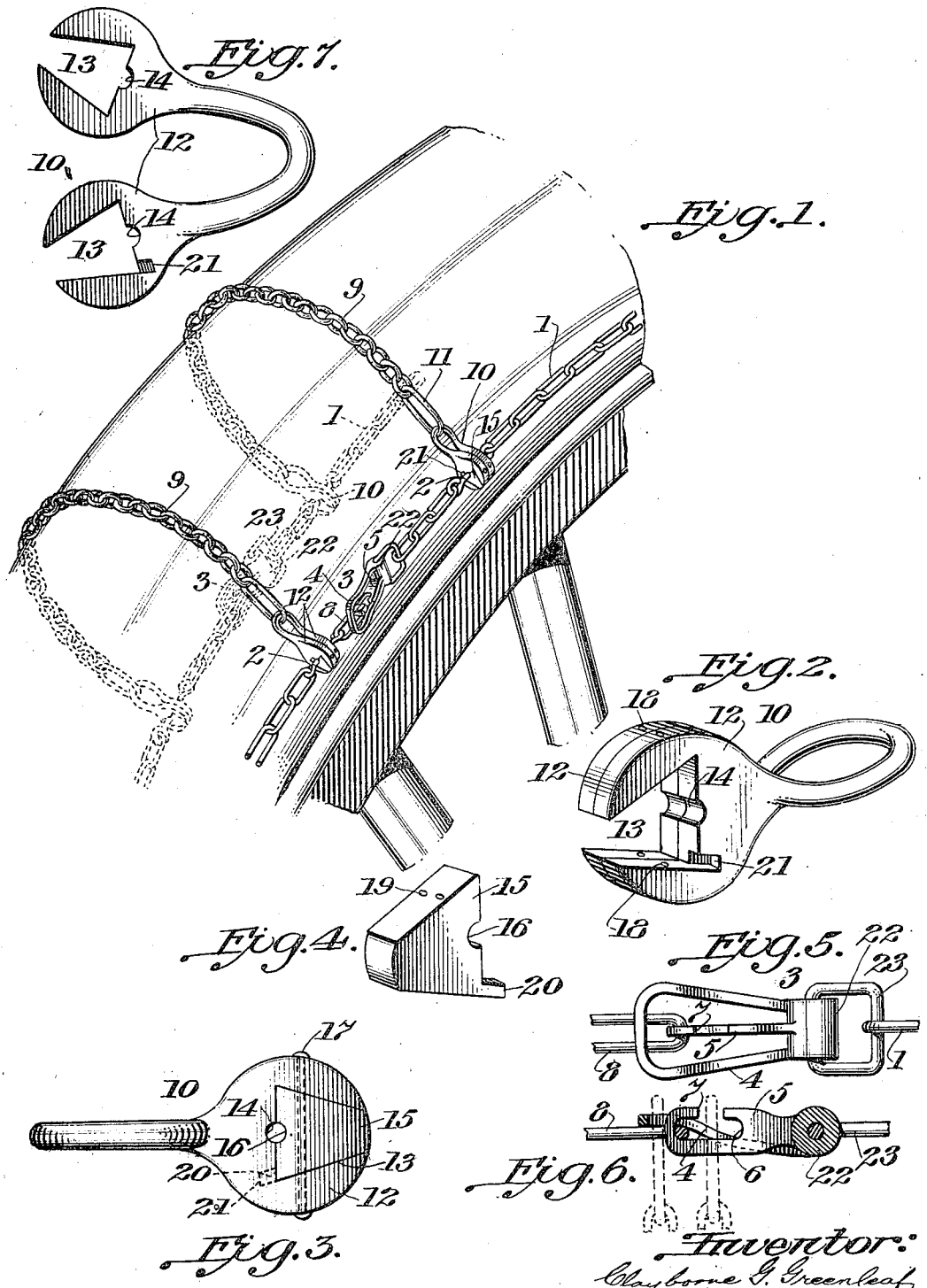

CLAYBORNE G. GREENLEAF, OF WEST RICHFIELD, OHIO.

ANTISKID DEVICE FOR WHEELS.

1,214,777.  Specification of Letters Patent.  Patented Feb. 6, 1917.

Application filed January 14, 1916. Serial No. 72,101.

*To all whom it may concern:*

Be it known that I, CLAYBORNE G. GREENLEAF, a citizen of the United States, residing at West Richfield, in the county of Summit and State of Ohio, have invented a certain new and useful Improvement in Antiskid Devices for Wheels, of which the following is a full, clear, and exact description.

The object of this invention is to provide a reversible or invertible chain for use on wheels having pneumatic or other like tires, to prevent slipping or skidding, which may be readily put on correctly and as easily removed, and wherein broken or damaged parts may be easily replaced.

The invention consists in its presently preferred form, of a pair of parallel chains adapted to extend circumferentially of the wheel and having a novel form of end connection, and also having at intervals straight links to which cross-chains to overlie the periphery of the tire are secured by a novel form of connection which admits of the ready replacement of a damaged cross-chain, the whole so constructed and arranged that the chain may be used either side up and its parts cannot buckle or become tangled so badly as to prevent the proper application of the anti-skid device to the wheel, as I will proceed now to explain and finally claim.

In the accompanying drawings illustrating the invention, in the several figures of which like parts are similarly designated, Figure 1 is a perspective view of a portion of a wheel and my device applied thereto. Fig. 2 is a perspective view of the cross-chain connection member, and Fig. 3 is a side elevation thereof with the closing block in place. Fig. 4 is a perspective view of the closing block for the connection member. Fig. 5 is a plan view, and Fig. 6 is a longitudinal section of a connection member for the circumferential chain. Fig. 7 is a perspective view of the connection member shown in Figs. 2 and 3, opened up as it will be to be put into engagement with the end link of a cross-chain.

The longitudinal parallel pair of chains is composed of like chains 1 of any suitable construction or type, and having at intervals the straight single piece links 2. At one end each chain is supplied with a connection-member 3, composed of a guard link 4 within which is a hook 5 having the long lengthwise slot 6 and a small mid-length opening 7, to be engaged by a link 8 at the opposite end of the chain when that end of the chain is drawn over sufficiently far to enter the opening, the link 8 thereafter slipping into the near end of the slot 6 and overlaid by the guard link 4, Figs. 1, 5 and 6, and so being held against accidental displacement. This connection remains firm and does not and cannot become unfastened regardless of the manner in which the device is applied with respect to the direction of revolution of the wheel.

The cross-chains 9 of any suitable construction or type, have at each end a connection-member 10, looped through the terminal links 11 of the cross-chains and provided with the terminal cheek-pieces 12 preferably flat and parallel and brought into intimate lateral contact. These cheek-pieces are provided with angular, preferably tapering, openings 13, with relatively narrow end openings, and seats 14 to conform to the straight links 2 of the longitudinal chains 1 and receive them, and when so applied to these links the openings 13 are closed by means of blocks 15 likewise provided with link-seats 16, and these blocks are held in place in the cheek-pieces by means of pins or rivets 17 placed in the holes 18 and 19 in the cheek-pieces and blocks respectively and headed up therein. Or the block may be provided with the end projection 20 to enter a recess 21 in one of the cheek pieces and thereby dispense with a pin fastener in that cheek-piece, one pin in connection with the projection 20 and recess 21 alone being sufficient to hold the parts together. Even when two fastening pins are used, the projection 20 and recess 21 will be of advantage in properly locating the block in the cheek-piece.

In order to reduce the necessity for welding in assembling the parts of the anti-skid device, the end links of the cross-chains are large enough to permit the opening of the connection-members 10, as in Fig. 7, so as to be threaded through the links, and thereafter closed about them.

It is to be noted that the connection-members 10 present no external angles or other surfaces that would tend to abrade or wear away the tire.

The connection-members 10 engage the straight links in such way that the anti-skid device may be applied to the wheel either side up; and further this engagement precludes the buckling or tangling of the parts of the device and hence greatly facilitates the application of the device to a wheel.

To renew a worm or damaged cross-chain, the fastening pins 17 are driven out, the blocks removed and the cross-chain then disengaged from the straight links. The connection-members 10 may be used on new lengths of cross-chains if desired, since they may be separated readily from old or worn chains without damage and as easily applied to new chains.

The connection-members 3 and the connection-members 10 have for all practical purposes an essentially swiveling connection with their engaged parts. The connection-member 3 may have its guard link 4 and hook 5 made in one piece with a hub 22, and this hub may be provided with a link 23 by which it may be engaged with the terminal link of the chain 1.

Owing to the smooth-sided cross-chain connections being applied to the longitudinal chains in a substantially swiveling manner, which permits free rotation of the longitudinal chains in said connections, this anti-skid device will not buckle or tangle during application to the wheel or while carried loosely in the car.

Variations in details of construction and arrangement of parts to suit exigencies of manufacture and use are considered and intended to be within the principle and scope of the invention as herein claimed.

What I claim is:—

1. An anti-skid device for wheels, having longitudinal chains, cross-chains connections between said longitudinal chains and said cross-chains which permit of free rotation of said longitudinal chains therein to prevent tangling of the device when not in use, and means for connecting the meeting ends of said longitudinal chains when the device is applied to a wheel.

2. An anti-skid device for wheels, having longitudinal chains provided with straight single-piece links, cross-chains connected with said links so as to have a swiveling action thereon to prevent tangling when the device is not in use, and means for connecting the meeting ends of said longitudinal chains.

3. An anti-skid device for wheels, having a pair of longitudinal chains, each having a series of straight single-piece links arranged at intervals throughout its length, means for detachably connecting the meeting ends of said chains, and cross-chains connected at their opposite ends with opposite single-piece links of said longitudinal chains so as to have a swiveling action thereon to prevent tangling of the device when not in use, the connections between said cross-chains and longitudinal chains being detachable for renewal purposes.

4. An anti-skid device, having longitudinal chains and end connections therefor, and cross-chains terminating in connection members which are provided with seats to receive the longitudinal chains, and blocks arranged in the connection members next to the seats and fasteners for said blocks to detachably fix the engagement of the connection members with the longitudinal chains.

5. In an anti-skid device, cross-chains having connection members at their ends including cheek-pieces arranged parallel and provided with transverse openings, and detachable blocks for closing said openings about the part engaged, and means for securing the blocks in place.

6. In an anti-skid device, cross-chains provided with connections for engaging the longitudinal applying-chains, said connections comprising a loop member terminating in rounded cheek-pieces in lateral parallel engagement, said cheek-pieces provided with transverse angular openings, a block adapted to close said openings, said block and cheek-pieces provided with seats to receive chain links, and pins for securing the block in the cheek-pieces.

7. In an anti-skid device, cross-chains provided with connections for engaging the longitudinal applying-chains, said connections comprising a loop member terminating in rounded cheek-pieces in lateral parallel engagement, said cheek-pieces provided with transverse angular openings, a block adapted to close said openings, said block and cheek-pieces provided with seats to receive chain links, and pins for securing the block in the cheek-pieces, one of the cheek-pieces having a recess and one edge of the block provided with a projection to enter said recess.

8. In an anti-skid device, longitudinal chains having straight single-piece links interposed therein at intervals, and cross-chains provided with terminal connection members having seats therein to receive the straight single piece links, and detachable blocks applied to the said connection members to close them in upon the straight single-piece links.

In testimony whereof I have hereunto set my hand this 14 day of January A. D. 1916.

CLAYBORNE G. GREENLEAF.

Witnesses:
 LILLIE M. KEELER,
 PHILIP F. LARNER.

It is hereby certified that in Letters Patent No. 1,214,777, granted February 6, 1917, upon the application of Clayborne G. Greenleaf, of West Richfield, Ohio, for an improvement in "Antiskid Devices for Wheels," errors appear in the printed specification requiring correction as follows: Page 2, line 3, for the word "worm" read *worn;* same page, line 36, claim 1, after the compound word "cross-chains" insert a comma; and that the said Letters Patent should be read with these corrections therein that the same may conform to the record of the case in the Patent Office.

Signed and sealed this 6th day of March, A. D., 1917.

[SEAL.]

F. W. H. CLAY,

*Acting Commissioner of Patents.*

Cl. 152—14.